(12) United States Patent
Williams et al.

(10) Patent No.: US 7,423,364 B2
(45) Date of Patent: Sep. 9, 2008

(54) SEALED MOVER ASSEMBLY

(75) Inventors: Eric C Williams, Los Alamos, NM (US); David F. Arnone, Mountain View, CA (US)

(73) Assignee: Bookham Technology plc, Northamptonshire (GB)

(*) Notice: Subject to any disclaimer, the term of this patent is extended or adjusted under 35 U.S.C. 154(b) by 379 days.

(21) Appl. No.: 10/888,028

(22) Filed: Jul. 9, 2004

(65) Prior Publication Data

US 2005/0006982 A1 Jan. 13, 2005

Related U.S. Application Data (60) Provisional application No. 60/486,641, filed on Jul. 11, 2003.

(51) Int. Cl.
*H01L 41/09* (2006.01)
*H02N 2/04* (2006.01)
*H02N 2/12* (2006.01)

(52) U.S. Cl. ............... 310/328; 310/323.01; 310/323.17

(58) Field of Classification Search ................ 310/328, 310/323.01, 323.02, 323.03, 323.04, 323.12, 310/323.13, 323.14, 323.17, 323.18, 340, 310/12, 20, 80; 74/89.23, 424.71
See application file for complete search history.

(56) References Cited

U.S. PATENT DOCUMENTS

| | | | |
|---|---|---|---|
| 3,709,621 A | | 1/1973 | Wake |
| 4,597,322 A | * | 7/1986 | Garnjost et al. ................ 92/60 |
| 5,053,670 A | * | 10/1991 | Kosugi ........................ 310/328 |
| 5,237,238 A | | 8/1993 | Berghaus et al. |
| 5,410,206 A | | 4/1995 | Luecke et al. |
| 5,449,869 A | | 9/1995 | Tinkham |
| 6,000,292 A | | 12/1999 | Nagai et al. |
| 6,603,229 B1 | * | 8/2003 | Toye, IV ....................... 310/90 |
| 2004/0212279 A1 | * | 10/2004 | Williams et al. ............ 310/328 |
| 2004/0239265 A1 | * | 12/2004 | Ziegler et al. ................ 318/116 |

FOREIGN PATENT DOCUMENTS

| | | |
|---|---|---|
| EP | 0 747 977 A1 | 12/1996 |
| IT | TS940004 | 11/1995 |
| JP | 05-122890 | 5/1993 |
| JP | 05-328752 | 12/1993 |

OTHER PUBLICATIONS

PCT International Search Report for PCT/US2004/022266.
PCT Written Ipion for PCT/US2004/022266.

* cited by examiner

*Primary Examiner*—Darren Schuberg
*Assistant Examiner*—Derek J Rosenau
(74) *Attorney, Agent, or Firm*—Steven G. Roeder; James P. Broder (57) ABSTRACT

A mover assembly (16) that moves or positions an object (12) includes a mover output (222), an actuator (344), and a mover housing assembly (220). The mover output (222) is connected to the object (12), and the actuator (344) causes the mover output (222) to move. The mover housing assembly (220) seals many of the other components of mover assembly (16), including the actuator (344) within a clean, nonvolatile, housing chamber (420) that isolates all contaminants from the outside working environment.

22 Claims, 7 Drawing Sheets

SEALED MOVER ASSEMBLY

RELATED APPLICATION

This application claims priority on pending Provisional Application Ser. No. 60/486,641 filed on Jul. 11, 2003 and entitled "SEALED MOVER ASSEMBLY". As far as is permitted, the contents of Provisional Application Ser. No. 60/486,641 are incorporated herein by reference.

BACKGROUND

Micromotors are used as part of an apparatus to make fine adjustments to the position and/or shape of an object. These motors are typically manufactured using volatile materials, adhesives and lubricants that outgas contaminants into the surrounding space. Many of these motors also produce contaminating wear particles resulting from rubbing and sliding within the motor. The presence of these types of contaminants can adversely influence the testing, manufacturing or measurements preformed by the apparatus.

SUMMARY

The present invention is directed to a mover assembly that moves or positions an object. In one embodiment, the mover assembly includes a mover output, an actuator, and a sealed mover housing assembly. The mover output is connected to the object and the actuator causes the mover output to move, shape or position the object.

In one embodiment, the mover housing assembly substantially seals and/or encloses many of the other components of mover assembly, including the actuator within a clean, non-volatile housing chamber that isolates some or substantially all of the contaminants from the outside working environment.

In one embodiment, the actuator includes a piezoelectric element that causes movement of the mover output. For example, the actuator can include a pair of opposed jaw elements that engage the mover output and the piezoelectric element can move the jaw elements relative to each other.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
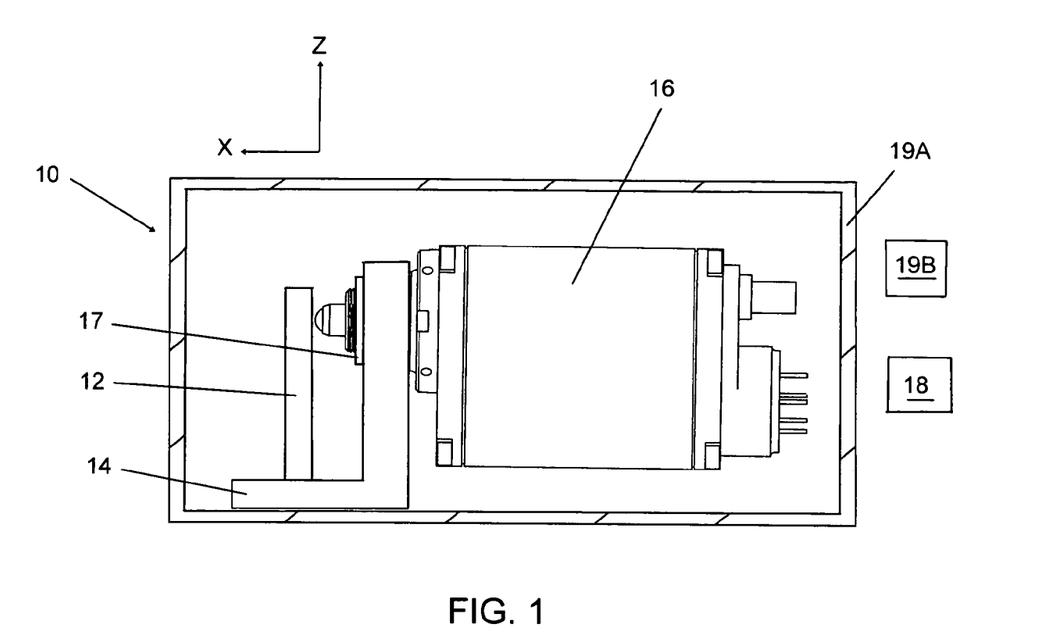
FIG. 1 is a simplified, side view, in partial cut-away, of a precision apparatus that utilizes a mover assembly having features of the present invention.

FIG. 1 is a side illustration of a precision apparatus 10 having features of the present invention. In FIG. 1, the precision apparatus 10 includes an object 12, an apparatus frame 14, a mover assembly 16, and a control system 18 that directs current to the mover assembly 16 and controls the operation of the apparatus 10. The design and orientation of these components can be changed to suit the requirements of the precision apparatus 10. Further, one or more of these components can be optional.

A number of Figures include an orientation system that illustrates an X axis, a Y axis that is orthogonal to the X axis, and a Z axis that is orthogonal to the X and Y axes. It should be noted that these axes can also be referred to as the first, second, and third axes. In general, there are six degrees of freedom, including translation along the X, Y and Z axes and rotation about the X, Y and Z axes.

The design of the components of the apparatus 10 and the type of apparatus 10 can be varied. For example, the apparatus 10 can be used as or in manufacturing, technical or scientific instruments including lasers, interferometers, mirrors, lenses, telescopes, filters, emitters or detectors. As examples, the object 12 can be a portion or all of a laser, interferometer, mirror, lens, telescope, filters, emitters or detectors.

The apparatus frame 14 is rigid and supports the object 12 and the mover assembly 16. In one embodiment, the apparatus frame 14 is connected to the mover assembly 16 at only one location. The manner in which the mover assembly 16 is secured to the apparatus frame 14 can vary according to the design of the precision apparatus 10. In FIG. 1, a portion of the mover assembly 16 extends through an aperture (not shown) in the apparatus frame 14. Further, in FIG. 1, a mover retainer 17 is threaded onto the mover assembly 16 to secure the mover assembly 16 to the apparatus frame 14.

The mover assembly 16 is coupled to the object 12 and adjusts the position and/or shape of the object 12. In one embodiment, the mover assembly 16 has a relatively low mass, small size, high load capability, wide operating temperature range, and/or low power consumption. In one embodiment, the mover assembly 16 provides adjustment with a resolution of about 20-50 nanometers or less over a range of at least +/−0.1 mm. In alternative embodiments, the adjustment resolution can be greater or less than 20-50 nanometers and/or the range of travel can be greater or less than +/−0.1 mm.

In one embodiment, the mover assembly 16 is fully sealed using accepted vacuum design techniques, including welding, brazed ceramic/metal electrical feed-thru, o-ring seals, and/or bellows. With this design, for example, the mover assembly 16 can be used in ultra-clean, high-vacuum, or Deep-UV laser optic applications without substantially influencing the surrounding environment. Stated another way, inside the sealed mover assembly 16 there are possibly particles and volatile substances. Outside the sealed mover assembly 16, the environment may be ultra-high vacuum, or an ultra-clean atmosphere.

In an optional embodiment, the mover assembly 16 can include a measurement system that allows for closed loop control of the mover assembly 16. For example, the measurement system can monitor the position of a portion of the mover assembly 16 and provide the information to the control system 18. Additionally or alternatively, the measurement system can include one or more sensors (not shown) that also monitor the position or shape of the object 12 and provide the information to the control system 18.

The control system 18 directs current to the mover assembly 16 to make fine adjustments to the position and/or shape of the object 12. An electrical line (not shown) can electrically connect the mover assembly 16 to the control system 18. In one embodiment, the control system 18 receives information regarding the position of the object 12 or a portion of the mover assembly 16 and directs a drive signal to the mover assembly 16 to make fine adjustments to the position and/or shape of the object 12. The control system 18 can include one or more processors. In FIG. 1, the control system 18 is positioned away from the mover assembly 16. Alternatively, the control system 18 can be incorporated partly or fully into the mover assembly 16.

Additionally, the precision apparatus 10 can also include an environmental chamber 19A that surrounds and encloses some or all of the rest of the components of the precision apparatus 10. In FIG. 1, the environmental chamber 19A is generally rectangular box shaped and encloses the object 12, the apparatus frame 14, and the mover assembly 16. It should be noted that the environmental chamber 19A can be designed to enclose additional components (not shown) of the precision apparatus 10. Further, the environmental chamber 19A can be designed to have another shape, such as spherical, cubical, octagonal, as non-exclusive examples.

In one embodiment, the precision apparatus 10 also includes an environmental source 19B that is used to control and/or create the desired environment within the environmental chamber 19A. For example, the environmental source 19B can create an ultra-high vacuum or partial vacuum within the environmental chamber 19A. Alternatively, for example, the environmental source 19B can create an ultra-clean atmosphere, or the environmental source 19B can fill the environmental chamber 19 with a replacement fluid, such as an inert gas, or other gas mixture.

Figure 2A:
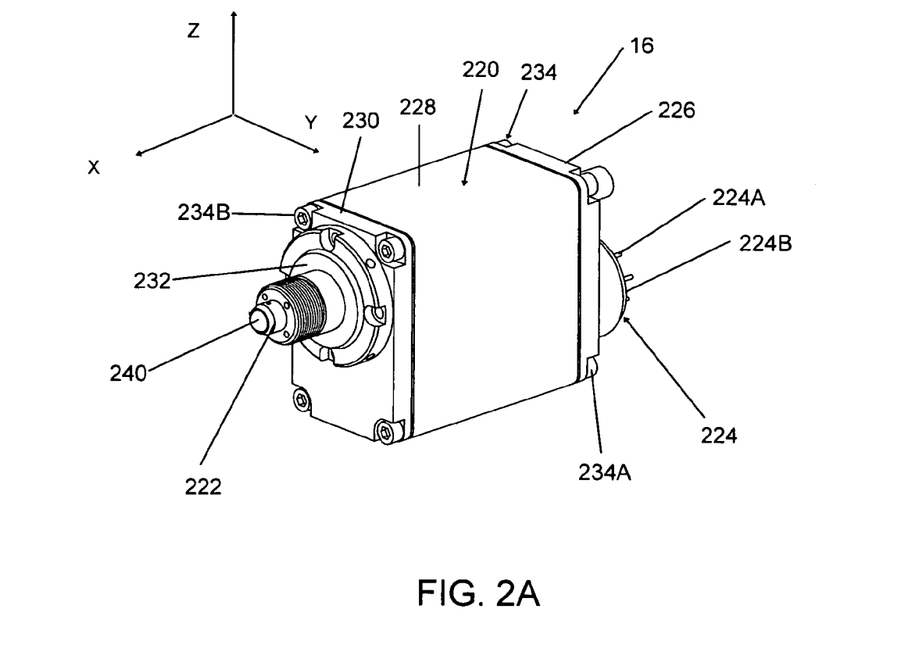
FIG. 2A is a perspective view of the mover assembly of FIG. 1.

FIG. 2A is a perspective view of the mover assembly 16 of FIG. 1 including a mover housing assembly 220, a mover output 222 and an electrical connector 224. In this embodiment, the mover housing assembly 220 includes a distal housing section 226, a center housing section 228, a proximal housing section 230, an attachment housing section 232, a fastener assembly 234, and a seal assembly 436 (illustrated in FIG. 4A). Alternatively, for example, one or more of the housing sections 226, 228, 230, 232 can be combined and made as a single unit. Further, one or more of the housing sections 226, 228, 230, 232 can also be referred to as the first, second, third, or fourth housing section.

One or more of the housing sections 226, 228, 230, 232 can be made of a rigid material. Examples of suitable materials for one or more of the housing sections 226, 228, 230, 232 include metals, such as aluminum, stainless steel, copper, or a hard plastic.

In one embodiment, the fastener assembly 234 includes (i) a plurality of distal fasteners 234A that secure the distal housing section 226 to the center housing section 228, (ii) a plurality of proximal fasteners 234B that secure the proximal housing section 230 to center housing section 228, and (iii) a plurality of attachment fasteners 434C (illustrated in FIG. 4A) that secure the attachment housing section 232 to the proximal housing section 230. In FIG. 2A, each fastener 234A, 234B, 434C is a bolt. Alternatively, for example, one or more of the fasteners 234A, 234B, 434C can include one or more welds or adhesives.

The mover output 222 includes an output distal end 240 that engages the object 12 (illustrated in FIG. 1). In one embodiment, the output distal end 240 is moved in a translating and non-rotating fashion. Stated another way, the output distal end 240 is moved linearly along the X axis without rotating about the X axis. Alternatively, for example, the output distal end 240 can be translating and rotating, or rotating without translating.

The electrical connector 224 includes one or more electrical pins 224A and a connector housing 224B. The pins 224A are electrically conductive and are used to electrically connect one or more of the internal components of the mover assembly 16 to the control system 18. The connector housing 224B electrically isolates the pins 224A from each other and the distal housing section 226. The pins 224A are sealed to the connector housing 224B.

Figure 2B:
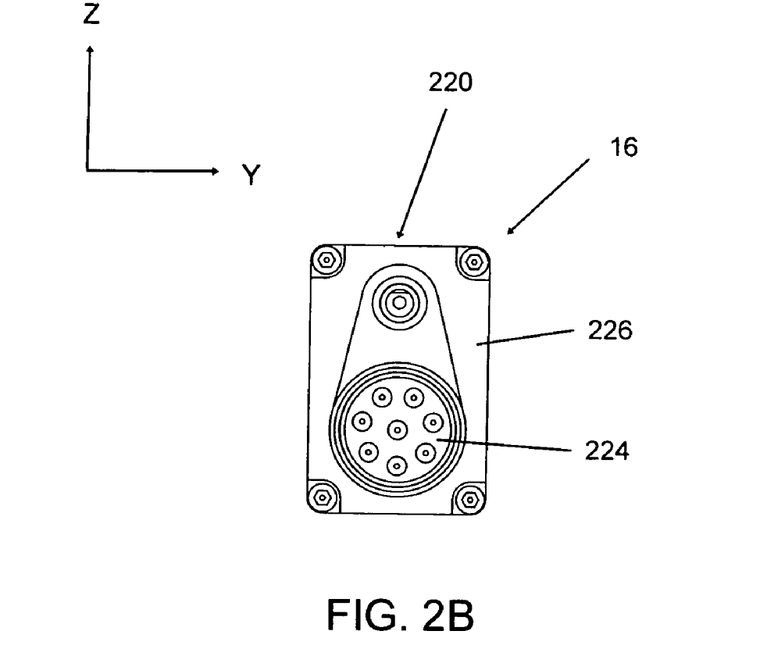
FIG. 2B is an end plan view of the mover assembly of FIG. 1.
Figure 2C:
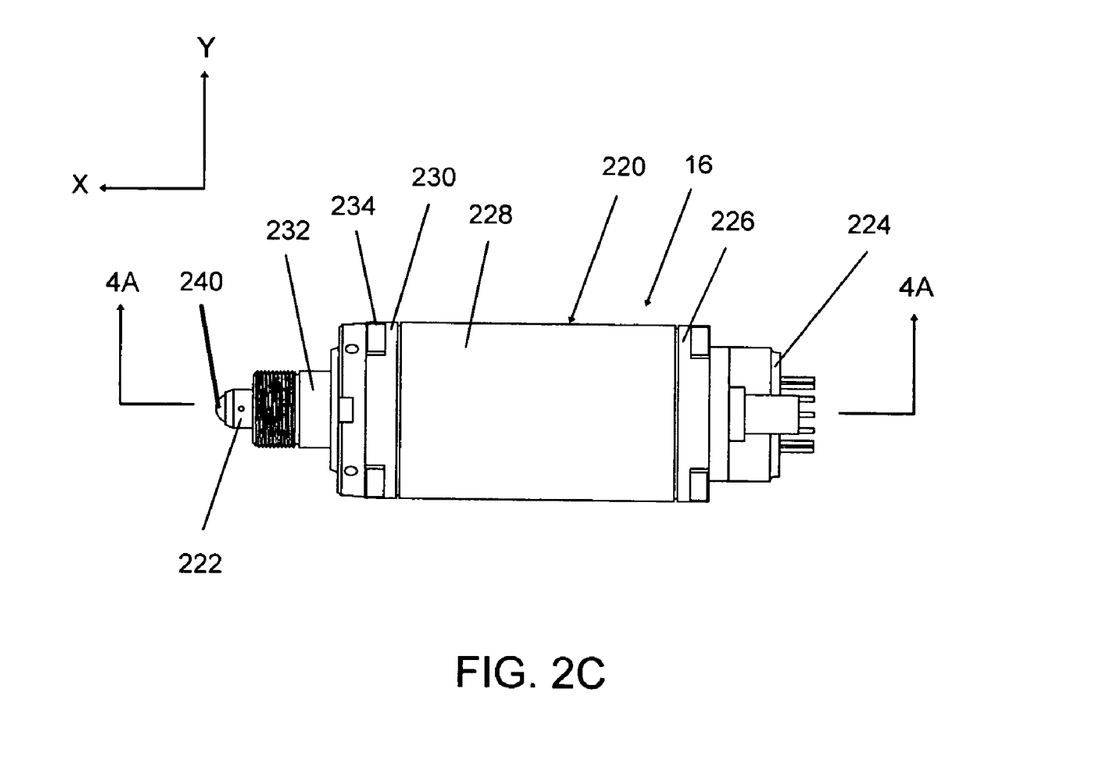
FIG. 2C is a top plan view of the mover assembly of FIG. 1.

FIG. 2B is an end plan view, and FIG. 2C is a top plan view of the mover assembly 16 including (i) the mover housing assembly 220 including the distal housing section 226, the center housing section 228, the proximal housing section 230, the attachment housing section 232, and the fastener assembly 234, (ii) the mover output 222 including the output distal end 240, and (iii) the electrical connector 224.

Figure 3A:
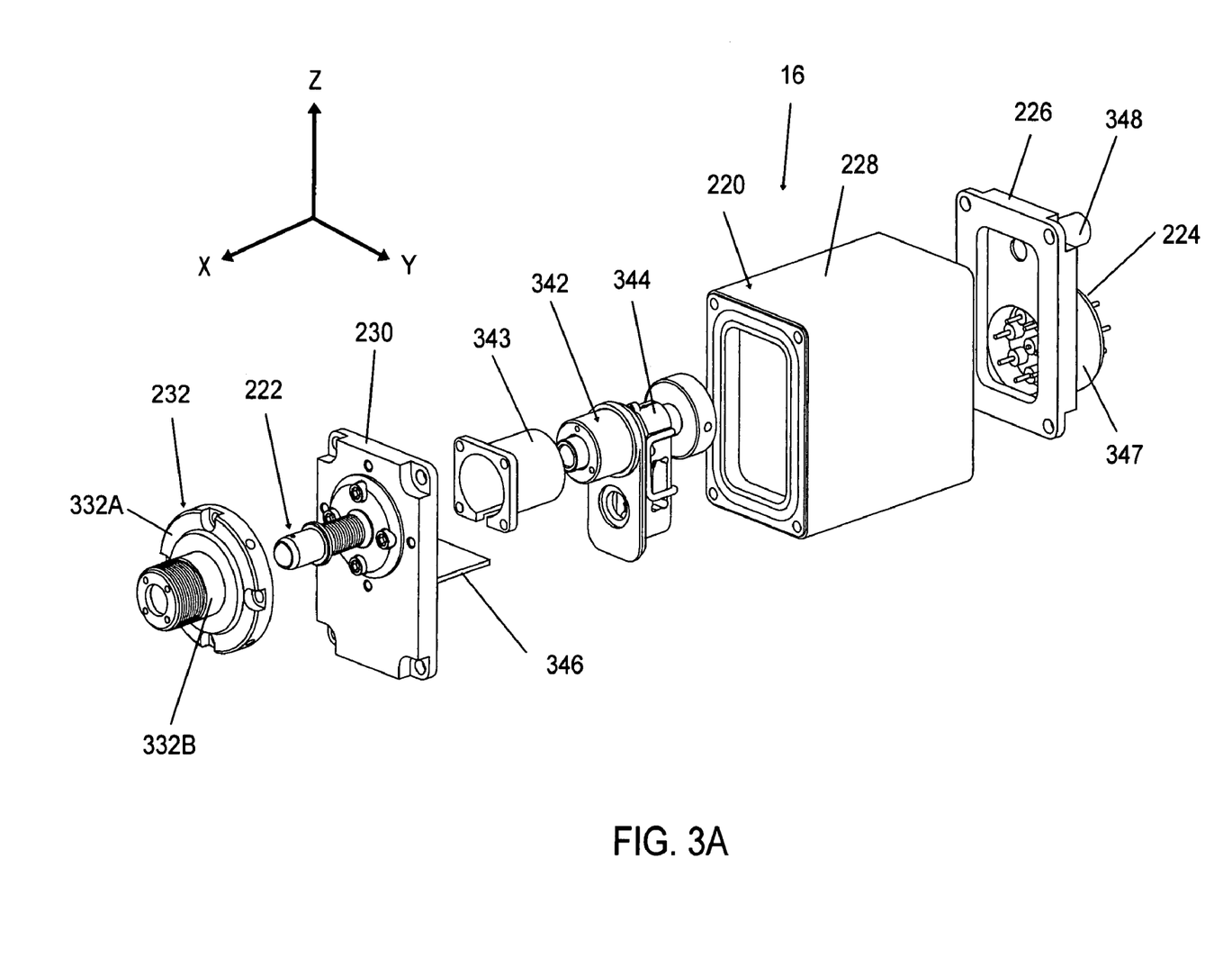
FIG. 3A is an exploded perspective view of the mover assembly of FIG. 2A.
Figure 3B:
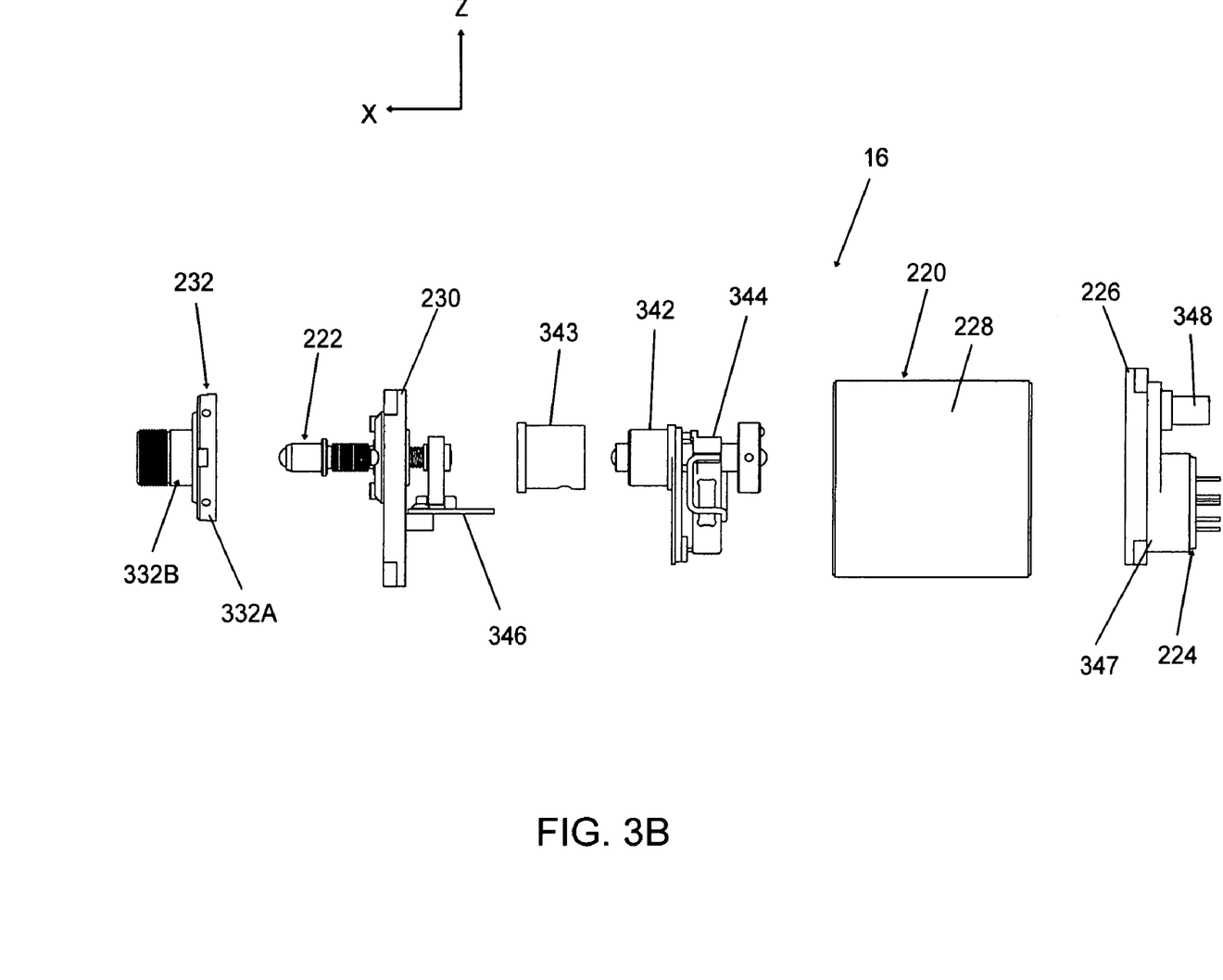
FIG. 3B is an exploded side view of the mover assembly of FIG. 2A.

FIG. 3A is an exploded perspective view and FIG. 3B is an exploded side view of a portion of the mover assembly 16 including the mover housing assembly 220, the mover output 222, the electrical connector 224, an output guide 342, a mount bracket 343, an actuator 344, and a limit sensor assembly 346. The design, size, shape and/or orientation of one or more of these components can be varied to suit the design requirements of the mover assembly 16.

FIGS. 3A and 3B illustrate the distal housing section 226, the center housing section 228, the proximal housing section 230, and the attachment housing section 232 in more detail. More specifically, in this embodiment, the distal housing section 226 is some what flat shaped and includes a tubular shaped protrusion 347 that is sized and shaped to receive the electrical connector 224 and a right cylindrical shaped aperture for receiving a tubular shaped leak test port 348. Alternatively, the protrusion 347 and/or the cylindrical shaped aperture can have another shape.

Pressurized fluid can be directed into the leak test port 348 to test that the mover housing assembly 220 is properly sealed. In alternative, non-exclusive embodiments, the mover housing assembly 220 maintains a seal up to a pressure differential of at least approximately 1, 2, 3, 4, 5, 6, 7, 8, 9, or 10 Atmospheres. Alternatively, fluid can be directed into the leak test port 348 to fill the mover housing assembly 220 with a desired fluid. Additionally or alternatively, the leak test port 348 can be used as a differential pumping port. In this embodiment, the volume inside the mover housing assembly 220 is continuously subjected to a pressure that is close to the pressure outside the mover housing assembly 220. For example, the volume inside the mover housing assembly 220 is continuously subjected to a pumped vacuum and the environment that surrounds the mover housing assembly 220 is subjected to a separately pumped vacuum. This can further reduce the chances of leakage or contamination.

The center housing section 228 is generally rectangular tube shaped and encircles many of the components of the mover assembly 16. The proximal housing section 230 is somewhat flat shaped and includes an output aperture so that the mover output 222 extends through the proximal housing section 230. The attachment housing section 232 includes a somewhat flat ring shaped region 332A and an externally threaded, tubular shaped region 332B. The tubular shaped region 332B fits through the opening in the apparatus frame 14 (illustrated in FIG. 1). In one embodiment, the mover retainer 17 (illustrated in FIG. 1) engages the tubular shaped region 332B to secure the mover assembly 16 to the rest of the apparatus 10.

In one embodiment, one or more of the housing sections 226, 228, 230, 232 can include one or more venting holes that permit the ready evacuation of the fluid contained within that part. The fasteners can also be vented.

Figure 4A:
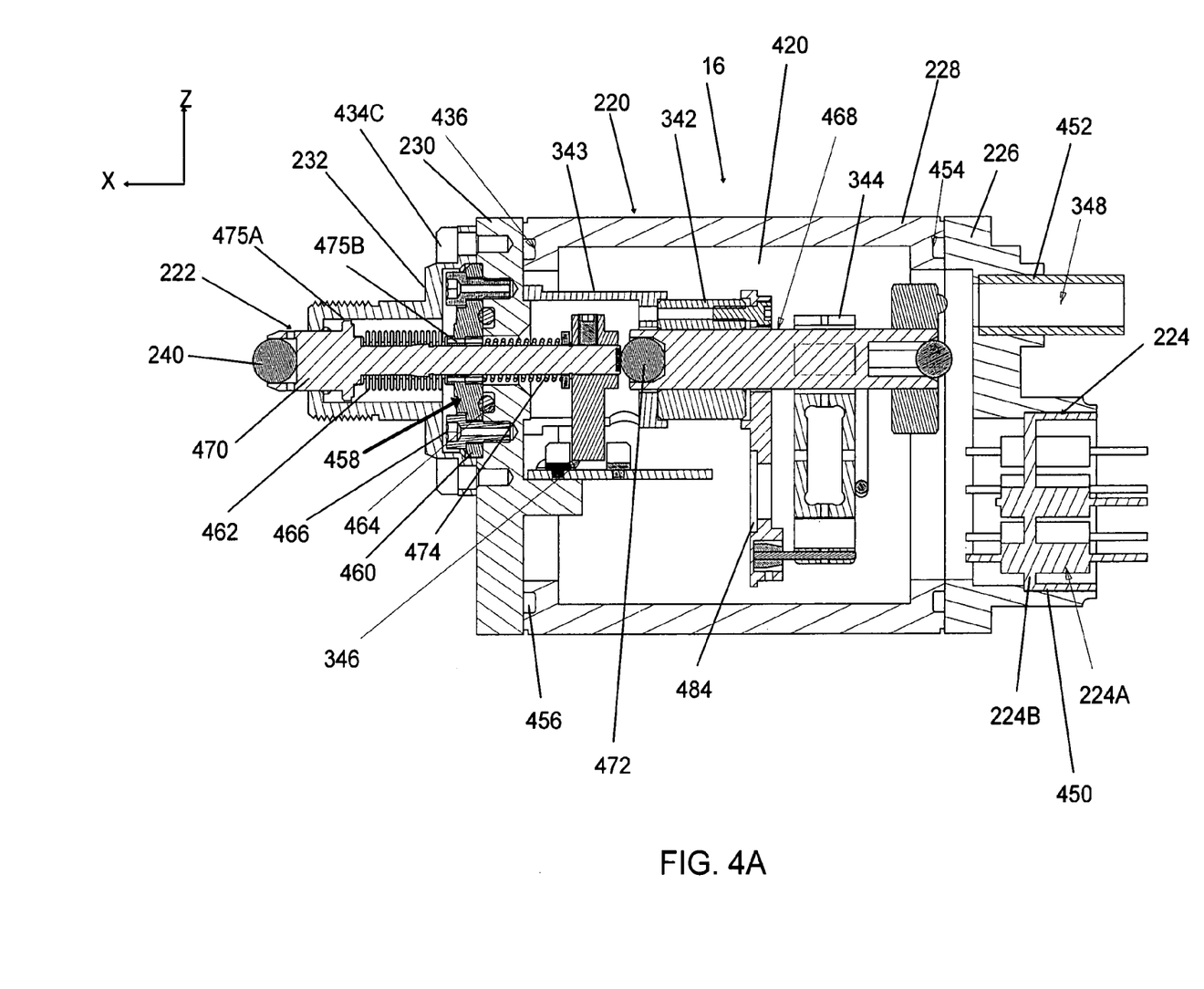
FIG. 4A is a cross-sectional view of the mover assembly taken on line 4A-4A in FIG. 2C.
Figure 4B:
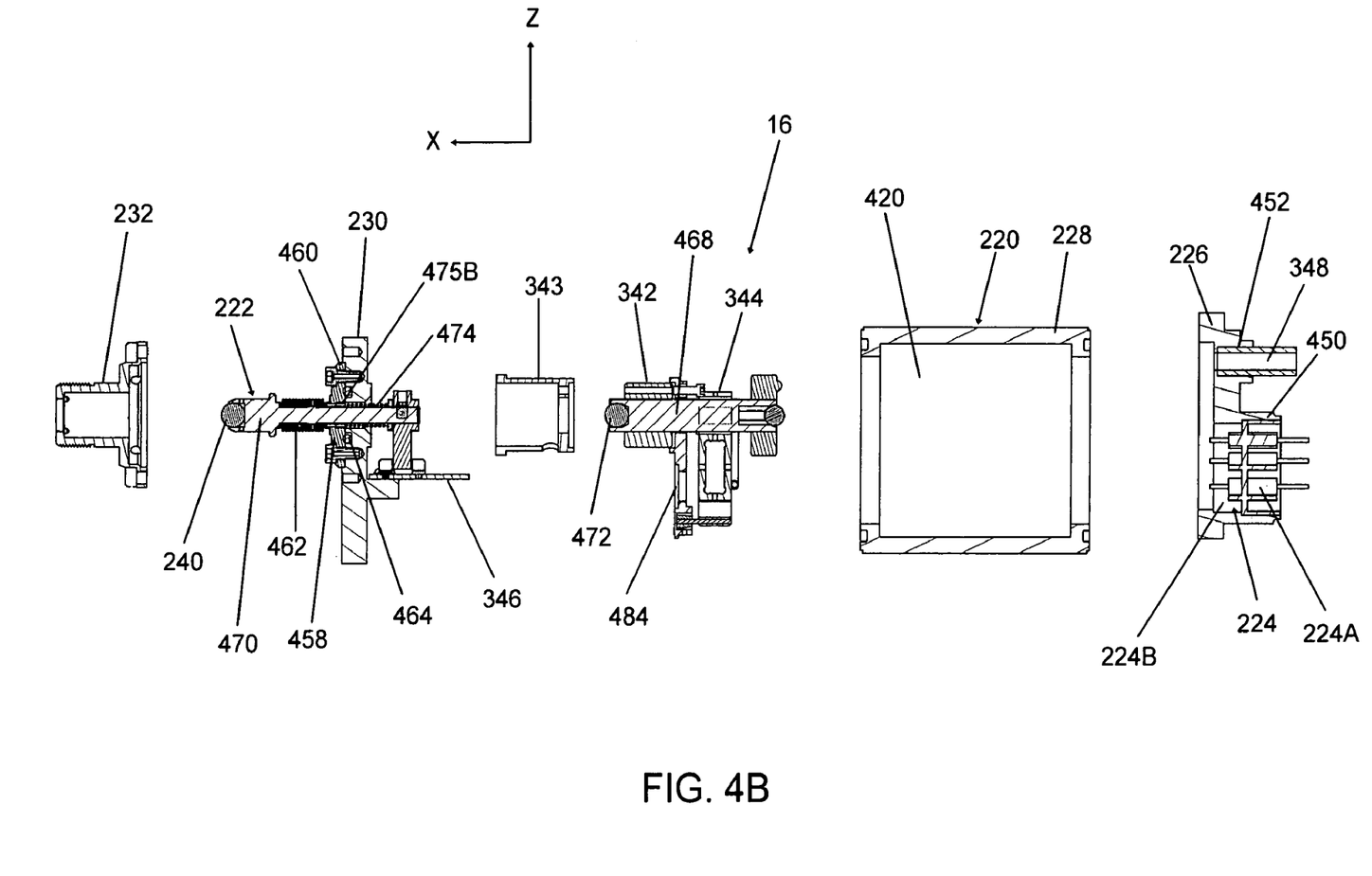
FIG. 4B is an exploded cross-sectional view of the mover assembly.

FIG. 4A is a cross-sectional view and FIG. 4B is an exploded cross-sectional view of the mover assembly 16 including the mover housing assembly 220, the mover output 222, the electrical connector 224, the output guide 342, the mount bracket 343, the actuator 344, and the limit sensor assembly 346. Further, the mover housing assembly 220 defines a housing chamber 420 that receives (i) a portion of the mover output 222, and (ii) the entire output guide 342, the mount bracket 343, the actuator 344, and the limit sensor assembly 346. Stated another way, the mover housing assembly 220 encircles and encloses a portion of the mover output 222, and the entire output guide 342, the mount bracket 343, the actuator 344, and the limit sensor assembly 346.

The seal assembly 436 cooperates with some of the other components of the mover housing assembly 220 to provide a sealed environment that surrounds and encloses the actuator 344, the output guide 342, the majority of the mover output 222 and the limit sensor assembly 346. With this design, in certain embodiments, the mover housing assembly 220 provides particle containment and inhibits dust, debris, and contaminants from the actuator 344, the output guide 342, and the majority of the mover output 22 from exiting the housing chamber 420 during operation of the mover assembly 16.

The design of the seal assembly 436 can be varied. In one embodiment, the seal assembly 436 seals (i) the housing sections 226, 228, 230, 232 together, (ii) the mover output 222 to the proximal housing section 230, and/or (iii) the electrical connector 224 to the distal housing section 226. For example, the seal assembly 436 can utilize one or more welds, adhesives, o-ring type seals, and/or bellows.

In one embodiment, the seal assembly 436 includes (i) a connector seal 450 that seals the electrical connector 224 to the distal housing section 226, (ii) a port seal 452 that seals the leak test port 348 to the distal housing section 226, (iii) a distal housing seal 454 that fits in a groove in the center housing section 228 that seals the distal housing section 226 to the center housing section 228, (iv) a proximal housing seal 456 that fits in a groove in the center housing section 228 that seals the proximal housing section 230 to the center housing section 228, and (v) an output seal assembly 458 that seals the mover output 222 to the proximal housing section 230.

The design of each seal can vary. In one embodiment, (i) the connector seal 450 and the port seal 452 are each a weld, and (ii) the distal housing seal 454 and the proximal housing seal 456 are each an O-ring type seal. Further, the output seal assembly 458 includes a generally annular ring shaped region 460, a bellows region 462, an O-ring type seal 464 that seals the ring shaped region to the proximal housing section 230, and a fastener assembly 466 that fixedly secures the ring shaped region 460 to the proximal housing section 230.

Alternatively, for example, the electrical connector 224 can be integral with the distal housing 226 by brazing or otherwise sealing the pins 224A into the mover housing assembly 220 while providing electrical isolation to each other and the mover housing assembly 220.

The bellows region 462 extends away from the ring shaped region 460 and encircles a portion of the mover output 222. In this embodiment, the bellows region 462 is made of metal and has a plurality of tubular pleats. One end of the bellows region 462 is fixedly secured to the ring shaped region 460 and the other end of the bellows region 462 is fixedly secured to the mover output 222. For example, the bellows region 462 can be secured to the ring shaped region 460 and the mover output 222 with welds or another type of seal. In one embodiment, the bellows region 462 allows the mover output 222 to move linearly and inhibits rotation of the mover output 222 while providing a seal around the mover output 222. Stated another way, the bellows region 462 provide an axially compliant seal between the translating mover output 222 and the vessel, and also provides a relatively stiff torsional connection between the mover output 222 and the mover housing assembly 220 providing the required torsional constraint needed to filter out rotational motion. Alternatively, for example, the bellows region 462 could be designed to allow the mover output 222 to move linearly and rotate, or rotate without moving linearly. Still alternatively, the bellows region 462 can be replaced or supplemented with another type of seal that allows for rotation and/or translation, such as a ferrofluidic seal or an 0-ring type seal as non-exclusive examples.

Moreover, the seal assembly 436 can include a port closer (not shown) that selectively opens and closes the test port 348. In one embodiment, the port closer is a plug that can be selectively threaded into and sealed to the test port 348. Alternatively, for example, the port closer can be a valve, e.g. a check valve, a gate valve, another type of valve, or a pinch tube.

In one embodiment, each of the pins 224A of the electrical connector 224 is individually sealed to the connector housing 224B. In one embodiment, the connector housing 224B is made of a non-conductive material, such as glass or ceramics, and the pins 224A are made of an electrically conductive material, such as copper. The pins 224A can be soldered or brazed to the connector housing 224B. Alternatively, an adhesive can be used to seal the pins 224A to the connector housing 224B.

The design of the mover output 222 can vary. In FIGS. 4A and 4B, the mover output 222 includes a first output shaft 468, second output shaft 470, a mechanical filter 472, and a bias device 474. In this embodiment, the first output shaft 468 is rotated about the X axis and is moved laterally along the X axis by the actuator 344 and the output guide 342. The first output shaft 468 is generally cylindrical shaft shaped and includes a proximal end and a distal end.

In one embodiment, a portion of the outer circumference of the first output shaft 468 includes an enhanced frictional area (not shown) that is engaged by the actuator 344. With this design, movement of the actuator 344 results in rotation of the first output shaft 468. In one embodiment, the output frictional contact area is an externally threaded area. In an alternative embodiment, the output frictional contact area is a roughened or a smooth area. In one embodiment, the majority of the outer circumference includes an 80 threads per inch externally threaded surface. Alternatively, the entire outer circumference can include the externally threaded surface, only a small portion of the outer circumference can include the externally threaded surface, or none of the outer circumference can include the externally threaded surface. It should also be noted that the pitch of the externally threaded surface can be greater than 80 threads per inch or less than 80 threads per inch.

The second output shaft 470 is generally cylindrical shaft shaped and includes a proximal end and a distal end that defines the output distal end 240. The output distal end 240 can include a ball bearing that fits in an aperture at the distal end of the second output shaft 470. The ball bearing engages the object 12 (illustrated in FIG. 1). Alternatively, the second output shaft 470 can be made with a semi-spherical end. In another embodiment, the output distal end 240 can be flat or have other shapes as needed.

In one embodiment, a first linear bearing 475A supports and guides the second output shaft 470 relative to the attachment housing section 232 and a second linear bearing 475B supports and guides the second output shaft 470 relative to the ring shaped region 460. Further, the bearings 475A, 475B allow for linear motion of the second output shaft 470 along the X axis and inhibit motion along the Y and Z axes. Stated another way, the non-rotating second output shaft 470 is guided on two radial-type bushings positioned on opposite sides of the bellows region 462.

The mechanical filter 472 mechanically connects the output shafts 468, 470 and acts as kinematic joint that passes only translational motion of the first output shaft 468 to the second output shaft 470. The mechanical filter 472 can be accomplished by having a ball-tip that is inserted in the distal end of the first output shaft 468 that pushes against a sapphire pad (or other hard material) that is fixed to the proximal end of the second output shaft 470. With this design, the mechanical filter 472 passes axial motion while decoupling the other 5 degrees of motion. More specifically, the mechanical filter 472 passes motion along the X axis, and inhibits motion along the Y and Z axes and about the X, Y, and Z axes.

The bias device 474 urges the second output shaft 470 along the X axis against the mechanical filter 472. The bias device 474 can be sized so that the second output shaft 470 maintains engagement with the first output shaft 468 via the mechanical filter 472 regardless of the operating pressure differential between the inside and outside of the housing. In one embodiment, the bias device 474 is positioned between the ring shafted region 460 and a portion of the limit sensor assembly 346 that is fixedly secured to the second output shaft 470. As examples, the bias device 474 can be a spring or another type of resilient member. In FIGS. 4A and 4B, the bias device 474 is a spring that encircles the second output shaft 470.

The output guide 342 supports the first output shaft 468, guides the first output shaft 468 and causes rotation of the first output shaft 468 by the actuator 344 to result in motion of the first output shaft 468 along the X axis. In one embodiment, the output guide 342 receives the first output shaft 468 and includes a generally tubular shaped housing having an internally threaded surface. The internally threaded surface engages the externally threaded surface of the first output shaft 468. The output guide 342 is fixedly secured with the mount bracket 343 to the proximal housing section 230. With this design, rotation of the first output shaft 468 with the actuator 344 about the X axis causes the first output shaft 468 to move transversely along the X axis relative to the output guide 342 and the rest of the mover assembly 16.

The actuator 344 rotates the first output shaft 468. The design of the actuator 344 can be varied. One example of an actuator which may be used are those sold under the trade name "New Focus Actuator" available from New Focus, Inc., San Jose, Calif. Other actuators include magnetostrictive actuators such as those available from Energen and piezoactuators. One embodiment of an actuator is described in U.S. Pat. No. 5,410,206, issued to Luecke et al. and assigned to New Focus, Inc., the contents of which are incorporated herein by reference. Other examples of suitable actuators in other electromagnetic actuators, hydraulic actuators and/or pneumatic actuators.

Figure 5:
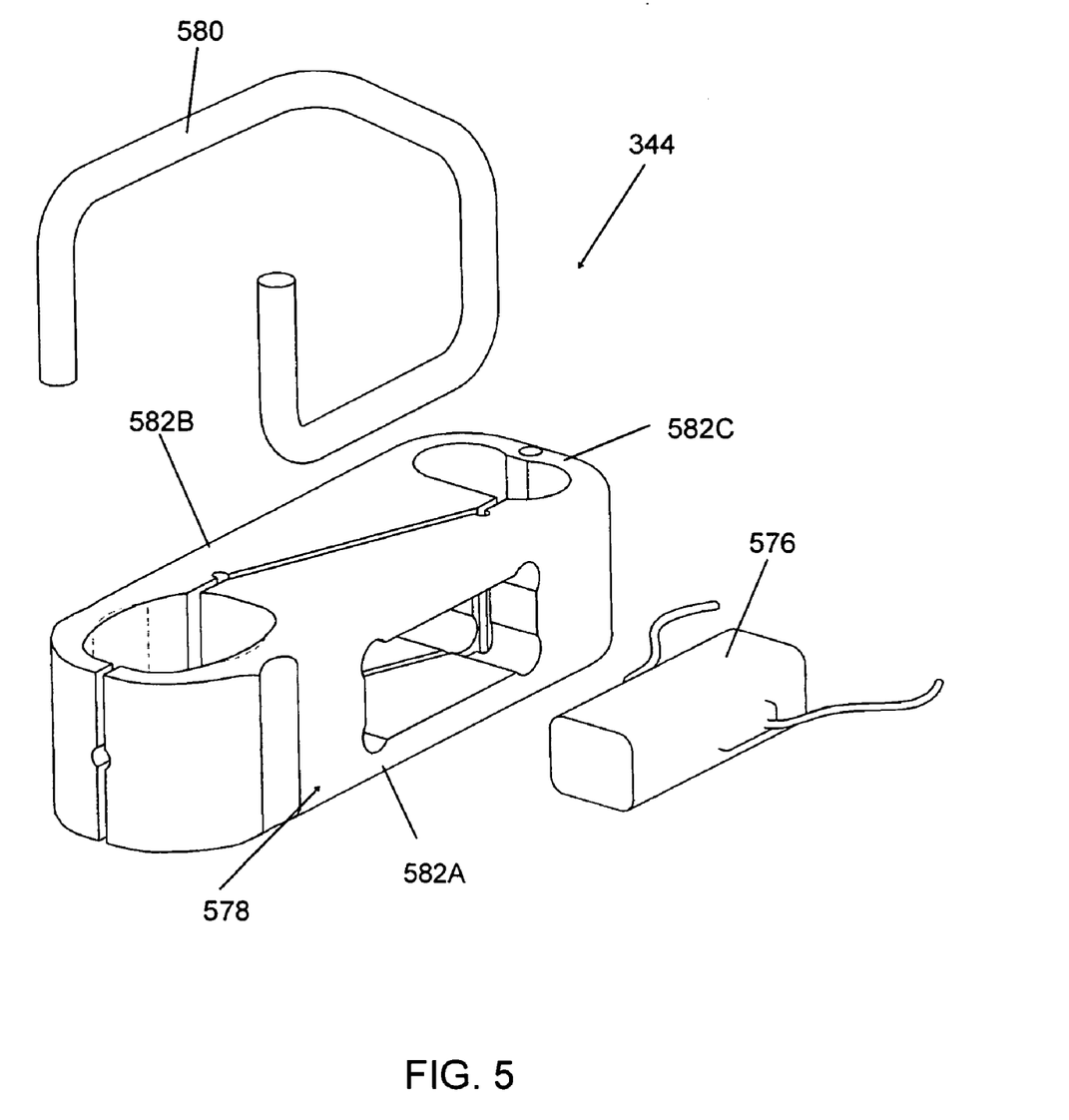
FIG. 5 is an exploded perspective view of an actuator that can be used in the mover assembly.

FIG. 5 illustrates an exploded perspective view of one embodiment of the actuator 344. In this embodiment, the actuator 344 includes a piezoelectric element 576, an actuator frame 578 and an actuator resilient connector 580.

The actuator frame 578 is somewhat rectangular shaped and includes (i) a first frame section 582A having a first jaw element, (ii) an adjacent second frame section 582B having a second jaw element, and (iii) a frame base 582C that secures the frame sections 582A, 582B together. The jaw elements are adjoining and cooperate to fit about the externally threaded surface of the first output shaft 468 (illustrated in FIGS. 4A and 4B). In one embodiment, each of the jaw elements includes an inward facing frictional contact area that engages the first output shaft 468 near the proximal end. In one embodiment, each of the frictional contact areas is a partly internally threaded region. The threads of the jaw elements act together to engage the externally threaded surface of the first output shaft 468 between the jaw elements. Stated another way, the internal faces of the jaw elements are threaded to accommodate the externally threaded surface of the first output shaft 468.

In an alternative embodiment, the frictional contact area is a roughened area that engages the first output shaft 468. In this embodiment, the portion of the outer circumference of the first output shaft 468 that is engaged by the jaw elements can be threaded or can include a corresponding frictional contact area.

The actuator resilient connector 580 urges the jaw elements against the externally threaded surface of the first output shaft 468. Stated another way, the actuator resilient connector 580 urges the jaw elements together so that the jaw elements maintain contact with the first output shaft 468.

A pair of spring retention grooves in jaw elements serve to position and retain the actuator resilient connector 580 in place. The actuator resilient connector 580 may be fashioned from any material having suitable spring and fatigue characteristics.

The piezoelectric element 576 is mounted within the actuator frame 578. In FIG. 5, a first end of the piezoelectric element 576 is affixed to the second frame section 582B and an opposite second end of the piezoelectric element 576 is affixed to the first frame section 582A.

The piezoelectric element 576 has electrodes at the opposite ends. The control system 18 (illustrated in FIG. 1) is electrically connected to the respective electrodes. With this design, the control system 18 can apply a drive signal across the piezoelectric element 576. The internal structure of piezoelectric element 576 may actually contain a plurality of interconnected electrodes so as to reduce the voltage required to operate the piezoelectric element 576.

The drive signal causes the length of the piezoelectric element 576 to change. For example, as the amplitude of the drive signal across the piezoelectric element 576 increases, the length of the piezoelectric element 576 increases, and as the amplitude of the drive signal across piezoelectric element 576 decreases, the length of the piezoelectric element 576 decreases.

With the design provided herein, lengthening and shortening of the piezoelectric element 576 causes the first jaw element to move relative to the second jaw element. Assuming that no slippage occurs between the jaw elements and the first output shaft 468, rotation of the first output shaft 468 occurs. Stated another way, the piezoelectric element 576 is operative to effect reciprocating motion of the abutting jaw elements in somewhat parallel paths. The reciprocating motion of the jaw elements against the first output shaft 468 held therebetween is converted to simple rotary motion by moving the jaw elements relatively slowly in a first direction such that the coefficient of friction between the first output shaft 468 and the jaw elements overcomes inertia of the first output shaft 468. Engagement is maintained between the jaw elements and the first output shaft 468 to incrementally rotate the first output shaft 468. Motion of the jaw elements in the second direction is relatively fast, such that the inertia of the first output shaft 468 prevents it from following the motion of the jaw elements and the first output shaft 468 slips in the jaw elements, preserving the preceding incremental motion. The result is a stepwise rotation of the first output shaft 468. Rotational motion of the first output shaft 468 in the reverse direction is accomplished by simply interchanging the speeds of the motion in the first and second directions.

The duration of slippage depends on the waveform and amplitude of the electrical signal applied across the piezoelectric element 576, as well as the mechanical characteristics of the system, such as the frictional engagement between jaw elements and the first output shaft 468, the inertia of the mover output 222 and other mechanical elements connected to it.

It follows that selective rotation of the first output shaft 468 may be obtained in either direction simply by applying a cyclic electrical signal having the proper waveform and polarity. That is, a cyclic signal having a slowly rising waveform followed by a rapidly falling waveform will cause rotation in a first direction. Conversely, a cyclic signal having a rapidly rising waveform followed by a slowly falling waveform will be effective to rotate the first output shaft 468 in the opposite direction.

In one embodiment, bidirectional rotation of the first output shaft 468 in the range of 2-3 RPM can be achieved. In one embodiment, a single step of the actuator 344 provides approximately 1 minute of rotational movement of the first output shaft 468, and very precise positioning on the order of 0.02 micrometers.

Referring back to FIGS. 4A and 4B, the actuator 344 is secured with an actuator bracket 484 to the output guide 342. In this embodiment, a motor mount pin extends through an aperture in the actuator frame 578 and is secured to the actuator bracket 484. With this design, the actuator 344 is inhibited from rotating relative to the actuator bracket 484 about the X axis, and the actuator 344 can move slightly along the X axis.

The limit sensor assembly 346 detects when a portion of the mover assembly 16 is at a maximum proximal travel limit or at a maximum distal travel limit and sends a signal to the control system 18 so that the control system 18 knows when a portion of the mover assembly 16 is at the maximum proximal travel limit or at the maximum distal travel limit.

In FIGS. 4A and 4B, the limit sensor assembly 346 includes (i) an interrupter circuit board, (ii) a first optical photointerrupter that is secured to the interrupter circuit board, (iii) a spaced apart second optical photointerrupter that is secured to the interrupter circuit board, (iv) a shutter plate, and (v) an optical shutter that is secured to the shutter plate. In this embodiment, (i) the interrupter circuit board and the optical interrupters are fixedly secured to the proximal housing section 230, and (ii) the shutter plate and the shutter are fixedly secured to the second output shaft 470 and move concurrently with the second output shaft 470.

In one embodiment, each optical photointerrupter includes a light source and a sensor that detects when the optical shutter is positioned between the light source and the sensor. A suitable limit sensor assembly can be made with components from Sharp, located in Japan.

Additionally, the limit sensor assembly 346 can include a third switch that identifies a central travel location that is between the maximum travel and the minimum travel.

In one embodiment, the mover assembly 16 also includes one or more hard stops (not shown) that limit travel to protect the device and interfacing equipment.

The materials used in the components of the mover assembly 16 are selected to avoid the worst out-gassing materials.

While the particular mover assembly 16 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A mover assembly that adjusts a position or shape of an object, the mover assembly comprising:
   a mover output that includes a first output shaft, and a second output shaft that is coupled to the object and the first output shaft;
   an actuator that rotates the first output shaft and moves the first output shaft linearly; and
   a mover housing assembly that substantially seals and encircles the actuator and forms a housing chamber around the actuator, the mover housing assembly inhibiting debris or gas created by the actuator from exiting the housing chamber, the mover housing assembly including a housing section and an output seal assembly that seals the second output shaft to the housing section.

2. The mover assembly of claim 1 wherein the actuator includes a piezoelectric element that causes rotation of the first output shaft.

3. The mover assembly of claim 2 wherein the actuator includes a pair of opposed jaw elements that engage the first output shaft and the piezoelectric element moves the jaw elements relative to each other to rotate the first output shaft.

4. The mover assembly of claim 1 wherein the mover output includes a mechanical filter that mechanically connects the first output shaft to the second output shaft, the mechanical filter functioning as a joint that passes only translational motion of the first output shaft to the second output shaft.

5. The mover assembly of claim 1 wherein the output seal assembly includes a bellow section that is connected to the second output shaft.

6. The mover assembly of claim 1 wherein the mover housing assembly includes a first housing section, a second housing section, and a housing seal that seals the intersection between the housing sections.

7. The mover assembly of claim 6 further comprising an electrical connector that extends through the first housing section and a connector seal that seals the electrical connector to the first housing section.

8. A precision apparatus including an object and the mover assembly of claim 1.

9. The precision apparatus of claim 8 further comprising an environmental chamber that encircles and encloses the object and the mover assembly.

10. A mover assembly that adjusts a position or shape of an object, the mover assembly comprising:
   a mover output that includes a first output shaft, a second output shaft that is coupled to the object, and a mechanical filter that mechanically connects the first output shaft to the second output shaft, the mechanical filter functioning as a joint that passes only translational motion of the first output shaft to the second output shaft;
   an actuator including a piezoelectric element that causes the first output shaft to rotate and move linearly; and a mover housing assembly that substantially seals and encircles the actuator and forms a housing chamber around the actuator, the mover housing assembly inhibiting debris or gas created by the actuator from exiting the housing chamber, the mover housing assembly including a housing section and an output seal assembly that seals the second output shaft to the housing section.

11. The mover assembly of claim 10 wherein the actuator includes a pair of opposed jaw elements that engage the first output shaft and the piezoelectric element moves the jaw elements relative to each other to rotate the first output shaft.

12. The mover assembly of claim 10 wherein the output seal assembly includes a bellow section.

13. The mover assembly of claim 10 wherein the mover housing assembly includes a first housing section, a second housing section, and a housing seal that seals the intersection between the housing sections.

14. The mover assembly of claim 13 further comprising an electrical connector that extends through the first housing section and a connector seal that seals the electrical connector to the first housing section.

15. The mover assembly of claim 10 wherein the mechanical filter passes motion along an X axis, inhibits motion along a Y axis and a Z axis, and inhibits motion about the X, Y, and Z axes.

16. A precision apparatus including an object and the mover assembly of claim 10.

17. The precision apparatus of claim 16 further comprising an environmental chamber that encircles and encloses the object and the mover assembly.

18. A method for moving or positioning an object, the method comprising the steps of:
coupling a mover output to the object, the mover output including a first output shaft, and a second output shaft that is coupled to the object and the first output shaft;
rotating the first output shaft and moving the first output shaft linearly with an actuator, wherein rotation of the first output shaft results in movement of the second output shaft substantially linearly; and
sealing and encircling the actuator with a mover housing assembly that forms a housing chamber around the actuator, the mover housing assembly inhibiting debris or gas created by the actuator from exiting the housing chamber, the mover housing assembly including a housing section and an output seal assembly that seals the second output shaft to the housing section so that debris or gas created by the actuator is inhibited from exiting the housing chamber between the second output shaft and the housing section.

19. The method of claim 18 wherein the step of rotating includes the steps of engaging the first output shaft output with a pair of opposed jaw elements and moving the jaw elements relative to each other with a piezoelectric element to rotate the first output shaft.

20. The method of claim 18 further comprising the step of controlling the pressure within the housing chamber so that the pressure within the housing chamber is approximately equal to the pressure outside the mover housing assembly.

21. The mover assembly of claim 1 wherein the output seal assembly seals the second output shaft to the housing section so that debris or gas created by the actuator is inhibited from exiting the housing chamber between the second output shaft and the housing section.

22. The mover assembly of claim 10 wherein the output seal assembly seals the second output shaft to the housing section so that debris or gas created by the actuator is inhibited from exiting the housing chamber between the second output shaft and the housing section.

* * * * *